May 18, 1965 D. G. BAZILL ETAL 3,184,576
BALL JOINT ASSEMBLY
Filed July 26, 1962 2 Sheets-Sheet 1
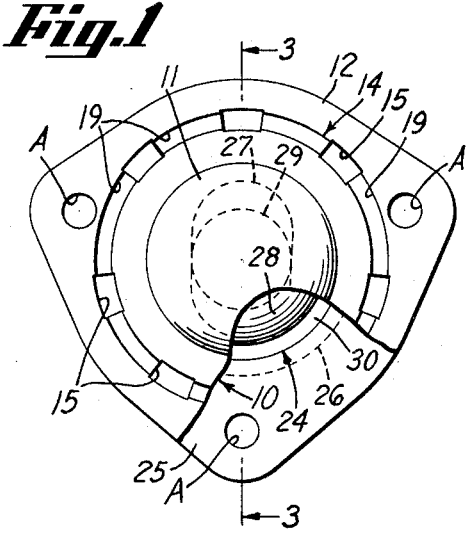
Fig.1
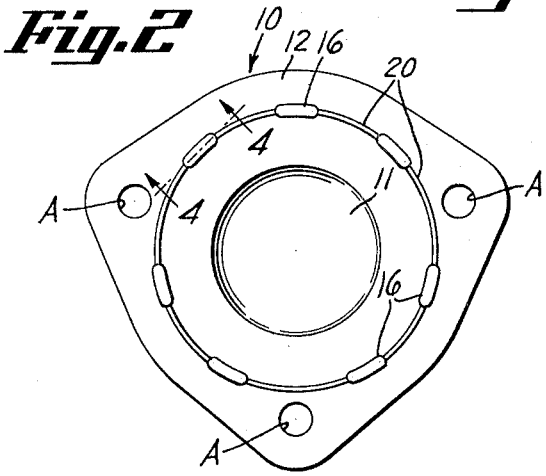
Fig.2 Fig.3
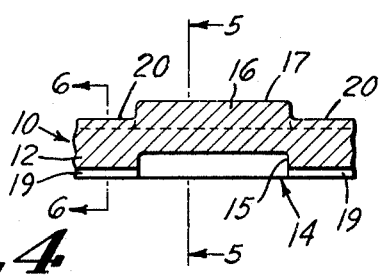
Fig.4
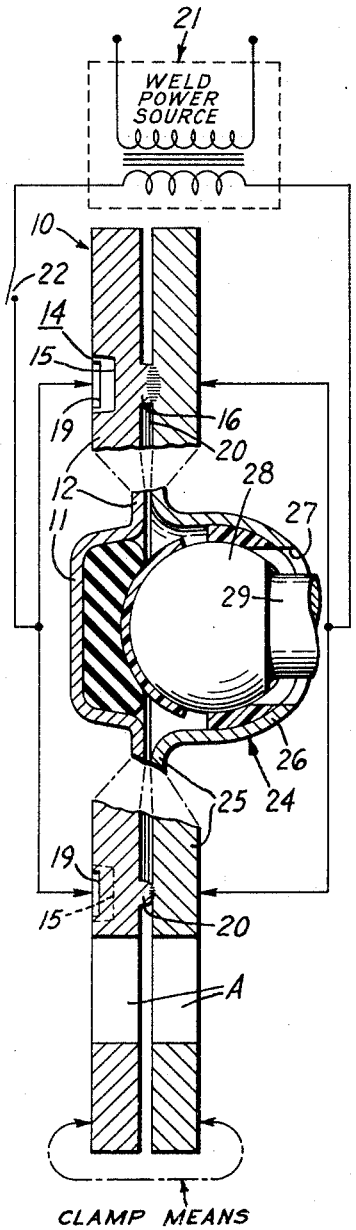
INVENTORS
DALE G. BAZILL
VERNON L. PICKERING
BY
Albert H. Reuther
ATTORNEY May 18, 1965    D. G. BAZILL ETAL    3,184,576
BALL JOINT ASSEMBLY
Filed July 26, 1962    2 Sheets-Sheet 2

INVENTORS
DALE G. BAZILL
VERNON L. PICKERING
BY
Albert H. Reuther
ATTORNEY

United States Patent Office 3,184,576
Patented May 18, 1965

3,184,576
BALL JOINT ASSEMBLY
Dale G. Bazill and Vernon L. Pickering, Dayton, Ohio, assignors to General Motors Corporation, Detroit, Mich., a corporation of Delaware
Filed July 26, 1962, Ser. No. 212,693
12 Claims. (Cl. 219—93)

This invention relates to ball joint means and, more particularly, to advantageous assembly thereof.

An object of this invention is to provide a new and improved ball joint assembly having a combination projection weld and seal therefor.

Another object of this invention is to provide hermetic sealing in a welded ball joint assembly by use in combination of both a relatively shallow projecting portion as well as larger main welding projections substantially in alignment with the shallow projecting portion so as to bond and seal concurrently with less power and less heat.

Another object of this invention is to provide a method of projection welding and hermetical sealing at reduced powering and heat loss in a generally annular configuration between mating components having a series of lug-like welding projections of greater depth than an annular projecting portion alignable with the projections for bonding and sealing therebetween by steps of first melting down the lug-like welding projections with a predetermined welding current flow until the annular projection comes in contact with the mating component, and then maintaining welding current flow just long enough to allow slight meltback of the annular projecting portion into a puddle-like mechanical dam as a seal between the components.

A further object of this invention is to provide a ball joint assembly including a socket portion having bearing means therein which could be damaged by excessive welding heat and which is to be protected by a mating cover portion in sealed relationship therewith regardless of perfect orientation of these portions with respect to the other due to a combination projection weld and seal between the portions including a plurality of lug-like main welding projections of predetermined depth spaced from each other on at least one of the portions and a more shallow projecting means also on at least one of the portions as well as extending in a path to interconnect the welding projections which require minimum power and heat during maintenance of current flow just long enough to allow slight meltback of the shallow projecting means into a metal-fused seal between the ball joint socket and cover portions.

Another object of this invention is to provide a combination projection weld and seal for ball joints and the like in which mating flange portions of a cover and socket of a housing initially have embossed stamping therebetween to form a mechanical dam due to progressive meltdown of intermittent lug-like weld projections which can have a triangular cross-sectional configuration of minimum base width and minimum apex radius to melt down until a relatively shallow annular projection comes in contact with a mating component and current flow is maintained just long enough to allow slight melting thereof into a contiguous seal against passage of dust, dirt, moisture and the like.

Further objects and advantages of the present invention will be apparent from the following description, reference being had to the accompanying drawings wherein preferred embodiments of the present invention are clearly shown.

In the drawings:

FIGURE 1 is a top view of one ball joint component such as a cover portion having a flange embossed in accordance with the present invention.

FIGURE 2 is a bottom view of the component of FIGURE 1.

FIGURE 3 is a composite sectional view taken along line 3—3 in FIGURE 1.

FIGURE 4 is a fragmentary sectional view taken along line 4—4 in FIGURE 2.

Improvements in mass production assembly of parts required in large volume are continually being sought. High volume production of motor vehicles and the like can require supply of large quantities of components or parts such as ball joint means adapted for use in vehicle suspension systems subject to considerable use and wear. Use of such ball joint means can be under varying conditions and previously, an internal elastomeric sealing lip could be provided as a shield against dust, dirt, moisture and the like which can enter along a juncture of a cover portion and a main body or socket portion of ball joint means in assembled relationship. Isolated spot welds or other suitable fastening means such as nuts and bolts could be used previously but still left space between the cover and socket portions where foreign material could enter. Use of more than isolated spot welds had to be avoided, particularly for ball joint assemblies because there is danger that excess heat could destroy internal bearing surfaces utilizing elastomeric or rubber materials as well as phenolic and other plastic materials. Also, on previous structures there could be danger that the cover and socket portions as well as an internal elastomeric sealing lip would not be in proper alignment relative to each other and thus foreign materials could still enter.

Figure 5:
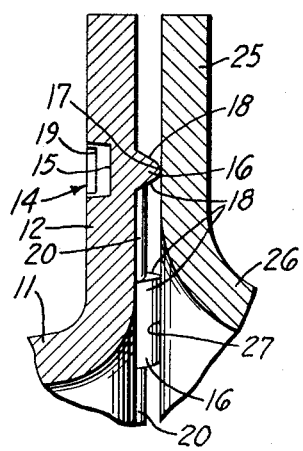
FIGURE 5 is a fragmentary sectional view taken along line 5—5 in FIGURE 4.
Figure 6:
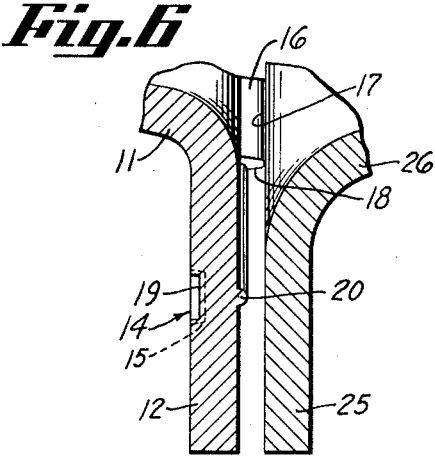
FIGURE 6 is a fragmentary sectional view taken along line 6—6 in FIGURE 4.

The present invention facilitates ball joint assembly and improves protection against passage of dust, dirt, moisture and the like. FIGURE 1 shows a metal cover portion generally indicated by numeral 10 including a cup-like central cap or offset head 11 integral with a laterally outwardly extending flange 12 through which suitable mounting apertures A can be provided for attachment of a completed ball joint assembly in a motor vehicle suspension system. A combination projection weld and seal means generally indicated by numeral 14 can be provided on the cover portion or component 10. This combination projection weld and seal means 14 includes a plurality of recesses or stamped embossing 15 along a top side of the cover portion 10 so as to provide a plurality of corresponding lug-like welding projections 16 which can be seen in views of FIGURES 2, 3, 4 and 5. Each of these intermittent lug-like weld projections 16 can have a triangular cross-sectional configuration formed during stamping thereof between cooperable die parts and illustrated in the view of FIGURE 5. An apex 17 formed at a juncture between sides 18 of each projection 16 can have a minimum radius commensurate with depth of displacement of the projection 16 and base width between remote junctures of the side surfaces 18 relative to the flange portion 12. In accordance with the present invention, the lug-like welding projections 16 formed by the embossing 15 can have a shallower embossing or depression 19 extending at least in locations substantially between the embossing 15 as can be seen in FIGURE 1. This embossing or more shallow depression indicated by numeral 19 results in formation of an annular projecting portion 20 as can be seen in views of FIGURES 2, 3, 4 and 6. The annular projecting portion 20 can have between one-fifth and one-third the height or depth of each of the lug-like welding projections. The lug-like welding projections can be modified in geometrical shape and dimensions according to the assembly and welded strength thereof to be provided. Height or depth of the annular weld projection 20 is determined according to needs to form a mechanical dam between the larger projection locations and cross-sectional shape of each of the lug-like projections can vary though the triangular configuration of FIGURE 5 has been found quite suitable.

When current from a welding power source 21 indicated in FIGURE 3 is supplied through suitable electrodes and/or lines subject to an on-off switch means 22, the cover portion 10 can be joined to a metal body or socket portion generally indicated by numeral 24 having a laterally outwardly extending flange 25 and a skirt-like extension 26 with an opening 27 therethrough. A stud means including a substantially spherical or curved head 28 and integral shank 29 can be fitted through the opening 27 and a bearing means 30 can be placed to fit in assembled relationship between the head 28 and inner surface of the skirt 26 of the socket component 24. Reference can be made to disclosures of copending applications belonging to the assignee of the present invention wherein differing bearing means and compositions thereof have been disclosed including applications Serial No. 744,598—Roode et al. filed June 25, 1958, Serial No. 858,656—Sullivan filed December 10, 1959, now Patent 3,097,060—Sullivan issued July 9, 1963, Serial No. 42,909—Baker filed July 14, 1960, now Patent 3,091,486—Baker issued May 28, 1963, as well as Serial No. 164,089—Geller et al., Serial No. 164,098—Couch et al. and Serial No. 164,009—Roode, the latter three all being filed January 3, 1962. The stud means including the head 28 and shank 29 as well as the socket portion 24 have been indicated in FIGURE 3. When current is passed through flanges 12 and 25 of the cover and socket portions located adjacent to each other for assembly, the relatively larger lug-like projections 16 melt down first until the more shallow annular projecting portion 20 comes in contact with the mating component or integral flange thereof. In accordance with the procedure of the present invention, current flow is maintained just long enough to allow a slight meltback of the annular projecting portion 20 and some intergranular fusion may occur though it is not absolutely necessary. In any event, the lug-like projections 16 in combination with the annular projecting portion 20 form a combination projection weld and seal along a juncture between the flanges 12 and 25 of the cover portion and socket portion, respectively. The lug-like projections 16 and interconnecting annular projecting portion 20 require a minimum of parts, particularly since an internal sealing lip can be omitted and only a bearing means for low friction and long wear need be provided internally of the ball joint assembly. The lug-like projections 16 assure sufficient weld strength at predetermined intervals and the annular projecting portion 20 provides an interconnecting dam for sealing purposes. The spacing of the projections 16 can vary though welding current required to melt the projections 16 of greater depth is not as great as if such greater depth were provided continuously and peripherally between the flanges of components to be joined. Due to less welding current being required there is also less heat that could damage or destroy internal bearing means made of materials such as phenolic, elastomeric as well as other plastic including polytetrafluoroethylene, acetal resin, polycarbonate resin and the like.

Figure 7:
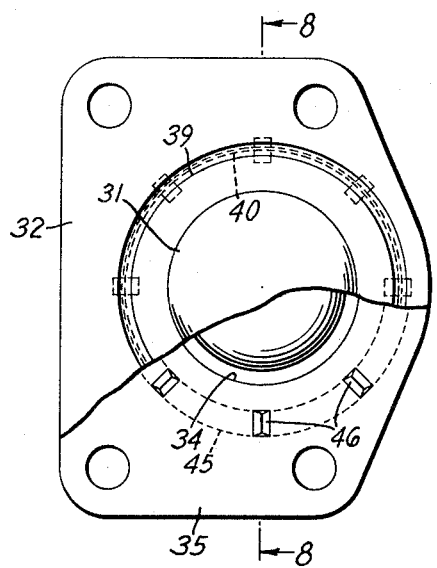
FIGURES 7, 8 and 9 are plan, side and fragmentary perspective views, respectively, of further weld-seal arrangements in accordance with the present invention.
Figure 8:
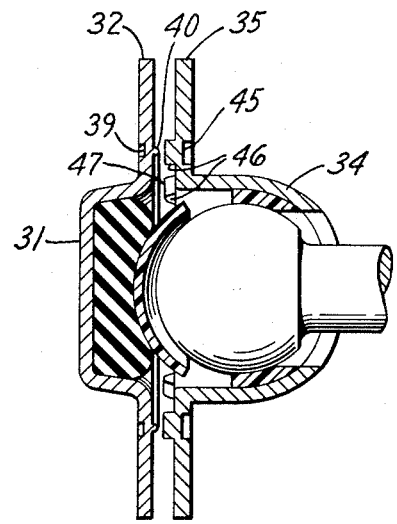

The combination projection weld and seal means such as 14 can consist of the entities of the relatively larger projections 16 and more shallow projecting portion without regard to orientation of one with respect to the other. Also, it is to be noted that the superimposed embossing of one on top of the other as illustrated in the views of FIGURES 1 and 2 can be modified to provide necessary components adapted to mate with each other though having the embossing of differing depth formed on separate flanges. The views of FIGURES 7 and 8 illustrate use of a cover portion having a central cap 31 and outwardly extending flange 32 as indicated in the views of FIGURES 7 and 8. A socket component 34 is provided with an integral and laterally outwardly extending flange 35 adapted to complement the flange 32. The flange 32 is provided with a relatively shallow embossing or annular depression 39 stamped between suitable die parts to form a continuous annular projecting portion 40 indicated in FIGURE 8. In the flange 35 of the socket component 34 there can be formed a plurality of relatively deeper recesses or embossments 45 caused by die stamping to form lug-like weld projections 46 comparable to the projections 16 though extending radially outwardly and adapted to be substantially transverse to the projecting portion 40 on a complementary member. Thus, these lug-like weld projections 46 will also melt initially and current flow is maintained just long enough to allow a slight meltback of the annular projecting portion 40 thereby forming a combination projection weld and seal means similar to that which can be obtained from the combination projection weld and seal means 14 noted earlier. The annular projecting portion 40 melts sufficiently into a mechanical sealing dam while the projections 46 per se provide weld strength in combination therewith. The location of the projections 46 at predetermined intervals is such that an apex 47 thereof intersects transversely or substantially at right angles to the projecting portion 40. Each of the projections 46 intercepts the path of the continuous projecting portion 40 and a minimum power and heat are required during maintenance of current flow just long enough to allow slight meltback of the shallow projecting means into a metal-fused seal between the ball joint socket and cover portions. Orientation of the cover portion relative to the socket portion does not require pinpoint accuracy though an effective combination weld and seal means is provided therebetween. Formation of a mechanical sealing dam due to melting of the relatively shallow projecting portion such as 20 or 40 can result in a contiguous seal against passage and/or entry of dust, dirt, moisture and the like and on some structures can avoid loss of lubricant from the ball joint cavity. However, recent trends are toward use of plastic materials requiring a minimum of lubrication and the main purpose of the mechanical sealing dam formed during the welding is to avoid passage of dust, dirt, moisture and the like. The projections such as 46 can intercept the projecting portion 40 radially thereof and there can also be alternate large and small embossments such as with the projections 16 and projecting portions 20 continuous and concentric relative to each other. On a typical ball joint assembly the projections per se such as 16 and 46 can have an offset depth in a range between .045 and .055 inch whereas the projecting portion such as 20 or 40 can have a depth in a range and curved outer surface between .010 and .015 inch.

Figure 9:
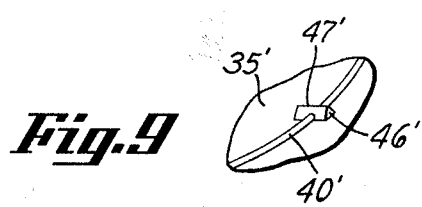

In FIGURE 9 there is a fragmentary perspective view of a flange 35' of a ball joint socket portion having embossing to provide both shallow projecting portion 40' and lug-like projections such as 46' with apex 47' integral therewith and for joining to a cover having a plain flange.

While the embodiments of the present invention as herein disclosed constitute preferred forms, it is to be understood that other forms might be adopted.

What is claimed is as follows:

1. In a ball joint assembly including a cover portion and socket portion to be joined to each other, an improvement which comprises having a combination projection weld and seal therefor which includes lug-like welding projections at predetermined locations on at least one of the portions and each having a depth dimension greater than that of another longer though further more shallow embossed projecting portion also on at least one of the portions so as to bond and seal collectively during welding operation between the cover and socket portions with less power and less heat due to limited-area initial melting of said lug-like welding projections followed by melting of the embossed projecting portion during welding operation though sufficient heating occurs to fuse said projections and said projecting portion for bonding and sealing respectively as well as structurally between the cover and socket portions.

2. A ball joint assembly, comprising, a laterally outwardly flanged cover portion and a flanged socket portion complementary to each other for journalling a stud means and head relative to bearing means, a plurality of lug-like welding projections provided at predetermined locations on at least one of said flanged portions, and a projecting means of depth less than that of said projections which melt during welding initially followed by slight melting of said projecting means also into a mechanical sealing dam supplemental to bonding established by said welding projections as melted between the flanged cover and socket portions.

3. The assembly of claim 2 wherein said projections are embossed in one of said portions and said projecting means is located in the remaining portion, said projections and projecting means having positioning in alignment with each other in a location intermediate said cover and socket portions prior to welding operation therebetween.

4. The assembly of claim 2 wherein said projections are provided integrally with said flanged socket portion and said projecting means is a substantially annular continuous embossment integral with said flanged cover portion, said projections extending radially with respect to said projecting means though said projections and projecting means have positioning in alignment with each other in a location intermediate said cover and socket portions just prior to welding operation therebetween.

5. The assembly of claim 2 wherein said projections and projecting means alternate concentrically as superimposed in alignment with each other upon one of said flanged portions.

6. The assembly of claim 2 wherein said projecting means has a depth in a range between one-fifth and one-third that of said projections which melt down initially in predetermined locations requiring less power than a full-depth continuous ring weld, said projections in predetermined locations assuring sufficient strength for bonding augmented by a hermetic mechanical seal with less overall total heat generated to effect a continuous ring dispersal of said projecting means of less depth in a slight meltback of the projecting means between said projections finally fused therebetween for both sealing and bonding collectively.

7. The assembly of claim 2 wherein said projections are substantially triangular in cross section with a minimum apex radius that aids in initial welding operation.

8. A method of projection welding and hermetically sealing at reduced powering and heat loss between flanged cover and socket portions of a ball joint assembly, comprising steps of embossing a plurality of lug-like welding projections of greater depth than another longer though more shallow projecting means orientable substantially in alignment with each other and each provided at predetermined locations on at least one of the portions along surfacing thereof generally between the flange portions, first melting down the lug-like welding projections with a predetermined welding current flow until the projecting means comes into contact between the mating portions, and then maintaining welding current flow sufficient only to effect further at least slight meltback of the shallower though longer projecting means into a puddle-like mechanical dam as a seal between the components.

9. Assembly procedure for a ball joint means having a cover portion and socket portion to fit complementary to each other for journalling a curved head of a stud means relative to a bearing means of elastomer, phenolic, plastic resin and the like to be protected from excessive heat during welding, comprising, steps of embossing a plurality of lug-like welding projections of greater depth than another longer though less deeply embossed projecting means orientable substantially in alignment with each other as provided at predetermined locations on at least one of the portions along surfacing thereof generally between the flange portions, and progressively melting the projections and the projecting means collectively to have said weld projections for weld strength and to have said projecting means supplemental to said weld projections in a continuous mechanical dam as a seal against passage of dust, dirt, moisture and the like kept from the bearing means subjected to a minimum of heat and weld power expenditure.

10. A ball joint assembly for use in motor vehicle suspension systems comprising, a socket portion having bearing means therein which could be damaged by excessive welding heat, a mating cover portion to fit complementary to said socket portion in sealed relationship therewith regardless of perfect orientation of these portions with respect to each other due to a combination projection weld and seal between the portions including a plurality of lug-like main welding projections of predetermined depth spaced from each other on at least one of the portions, and a more shallow projecting means also on at least one of the portions as well as extending in a path to interconnect the welding projections which require minimum welding power and heat during maintenance of current flow sufficient only for positively effecting slight meltback of said shallow projecting means into metal-fused seal between said ball joint socket and cover portions.

11. A combination projection weld and seal for ball joints and the like having mating flange portions of a cover and socket of a housing initially having embossed stamping therebetween, comprising, intermittent lug-like weld projections on one of said flange portions, and a projecting means of substantially less depth than that of said projections which melt down first from an apex thereof to said projecting means that melt sufficiently into a supplemental mechanical dam as a contiguous seal against passage of dust, dirt, moisture and the like.

12. In assembly procedure for bearing means having flanged socket-forming portions to fit complementary to each other for journaling a member pivotally therein as to low friction internal bearing surfacing normally susceptible to damage due to excess heat during use of more than isolated spot welding and including embossing of lug-like welding projections of greater depth than another additionally longer though more shallow projecting means orientable substantially in alignment with each other and each provided at predetermined locations on at least one of the flanged portions, the improvement which comprises sequentially melting first the greater depth projections and then the longer though more shallow projecting means successively and collectively for bonding strength due to fusion of the weld projections augmented by dispersal of the projecting means to seal against passage of dust, dirt, moisture and the like kept therefrom though subjected to acceptable damage-free heat rise and lower weld power expenditure than would be encountered if more than isolated spot welding were used, said sequential melting also instantaneously aligning the flanged portions as sealed during fusion of weld projections collectively with the additionally longer projecting means therebetween.

References Cited by the Examiner
UNITED STATES PATENTS 2,315,357    3/43    Smith _____ 29—184.4
2,500,886    3/50    Torkelson _____ 16—21

RICHARD M. WOOD, *Primary Examiner.*